United States Patent
Plecko (10) Patent No.: US 10,589,747 B2
(45) Date of Patent: Mar. 17, 2020

(54) METHOD FOR DETERMINING THE INCLINE OF A ROAD

(71) Applicant: Robert Bosch GmbH, Stuttgart (DE)

(72) Inventor: Sven Plecko, Bietigheim-Bissingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 16/135,362

(22) Filed: Sep. 19, 2018

(65) Prior Publication Data
US 2019/0092336 A1  Mar. 28, 2019

(30) Foreign Application Priority Data
Sep. 26, 2017 (DE) .......... 10 2017 217 005

(51) Int. Cl.
| | |
|---|---|
| *B60W 40/076* | (2012.01) |
| *B60W 10/18* | (2012.01) |
| *B60W 10/184* | (2012.01) |
| *G06K 9/00* | (2006.01) |

(52) U.S. Cl.
CPC ........ *B60W 40/076* (2013.01); *B60W 10/182* (2013.01); *B60W 10/184* (2013.01); *G06K 9/00798* (2013.01); *B60W 2420/42* (2013.01); *B60W 2550/142* (2013.01); *G06T 2207/10016* (2013.01); *G06T 2207/30256* (2013.01)

(58) Field of Classification Search
CPC ............ B60W 10/182; B60W 10/184; B60W 2420/42; B60W 2550/142; B60W 40/076; G06K 9/00798; G06T 2207/10016; G06T 2207/30256
See application file for complete search history.

(56) References Cited

U.S. PATENT DOCUMENTS

| | | | | |
|---|---|---|---|---|
| 9,443,154 B2* | 9/2016 | Stein | ......................... | B60R 1/00 |
| 9,598,086 B2* | 3/2017 | Heim | .................... | B60W 30/16 |
| 2004/0080450 A1* | 4/2004 | Cheong | ................. | G01S 7/4026 |
| | | | | 342/118 |
| 2009/0103781 A1* | 4/2009 | Fleury | ................... | B60W 40/02 |
| | | | | 382/104 |
| 2009/0312906 A1* | 12/2009 | Bauer | ................... | B60W 40/04 |
| | | | | 701/36 |
| 2010/0299109 A1* | 11/2010 | Saito | ....................... | G01S 11/12 |
| | | | | 703/1 |
| 2013/0103305 A1* | 4/2013 | Becker | ................... | G01C 21/32 |
| | | | | 701/411 |

(Continued)

FOREIGN PATENT DOCUMENTS

DE    10 2013 221 696 A1    4/2015

*Primary Examiner* — Babar Sarwar
(74) *Attorney, Agent, or Firm* — Maginot, Moore & Beck LLP (57) ABSTRACT

A method for determining an incline of a road on which a vehicle is located includes importing image data of an environment of the vehicle, the image data being generated by an image sensor. The method further includes identifying a defined reference object in the environment of the vehicle from the image data and identifying a relationship between the identified reference object and a defined reference system of the image sensor. The method also includes estimating the incline of the road on the basis of the identified relationship and providing a signal representing the incline of the road.

15 Claims, 9 Drawing Sheets

(56) References Cited

U.S. PATENT DOCUMENTS

| | | | |
|---|---|---|---|
| 2014/0278065 A1* | 9/2014 | Ren | G06T 15/04 |
| | | | 701/454 |
| 2015/0049913 A1* | 2/2015 | Zhong | G06T 7/60 |
| | | | 382/104 |
| 2015/0086080 A1* | 3/2015 | Stein | G06K 9/00798 |
| | | | 382/104 |
| 2015/0120153 A1* | 4/2015 | Heim | B60W 30/16 |
| | | | 701/51 |
| 2017/0316333 A1* | 11/2017 | Levinson | G01S 17/87 |
| 2019/0034740 A1* | 1/2019 | Kwant | G06K 9/00798 |
| 2019/0205667 A1* | 7/2019 | Avidan | G06K 9/00791 |

\* cited by examiner

METHOD FOR DETERMINING THE INCLINE OF A ROAD

This application claims priority under 35 U.S.C. § 119 to patent application no. DE 102017217005.0 filed on Sep. 26, 2017 in Germany, the disclosure of which is incorporated herein by reference in its entirety.

The disclosure relates to a method for determining an incline of a road on which a vehicle is located, wherein the method comprises the following steps: importing image data of an environment of the vehicle, which are generated by an image sensor; identifying a defined reference object in the environment of the vehicle from the image data; identifying a relationship between the identified reference object and a defined reference system of the image sensor; estimating the incline of the road on the basis of the identified relationship; and providing a signal representing the incline of the road. The disclosure further relates to a correspondingly configured device for carrying out the method.

BACKGROUND

Patent application DE 10 2013 221 696 A1 is known from the prior art, for example. This document relates to a method for determining a vertical profile of a street ahead of a vehicle. The method here includes a step of importing a motion path of an object provided by an image sensor, wherein the motion path is imported as a plurality of images, and importing at least one parameter relating to the object from a parameter sensor that is independent of the image sensor. Moreover, the method includes a step of determining the vertical profile of the street ahead of the vehicle using at least one vertical position of the object in the image and the parameter in order to identify the vertical profile of the street ahead of the vehicle.

For different driving maneuvers, such as for automated parking (HAP—highly automated parking), an incline detection is also necessary so that the vehicle can be positioned and in accordance parked with the available retaining forces of the automated parking brake. The incline is usually detected by means of an acceleration sensor, which is typically incorporated into the braking control unit (ABS/ESP), airbag control device or stand-alone. Alternative concepts for determining the incline are sought and developed within the scope of developing driving functions for automated parking/driving.

SUMMARY

By contrast, the method and device according to the disclosure advantageously permit an alternative solution, which can be implemented cost-effectively with already existing components. Advantageously, this solution can also be employed as a redundancy concept for instances when the regular acceleration sensor fails.

According to the disclosure, this is permitted by the features as disclosed. Further configurations of the disclosure are disclosed.

A method for determining an incline of a road on which a vehicle is located, wherein the method comprises the following steps:
importing image data of an environment of the vehicle, which are generated by an image sensor;
identifying a defined reference object in the environment of the vehicle from the image data;
identifying a relationship between the identified reference object and a defined reference system of the image sensor;
estimating the incline of the road on the basis of the identified relationship; and
providing a signal representing the incline of the road.

It should first be noted that the term "incline of a road" (also called gradient, slope or pitch of the vehicle) is understood on the one hand to refer to the incline of the road in the driving direction of the vehicle (longitudinal axis). Furthermore, the incline of a road is also understood to be the incline of the road (also called the roll angle of the vehicle) orthogonally to the driving direction of the vehicle (transverse axis). The method can thus determine the incline of the road in the driving direction of the vehicle and/or the incline of the road in the rolling direction of the vehicle. Moreover, this is understood to mean that the method estimates the incline of a road based on image sensor data, such as camera image data. The incline can be defined, for example, in a percentage or degrees and/or can be described in an encoded manner. Advantageously, the described method allows for a simple estimation of the road incline in the longitudinal and transverse axes based on the relationship between a recognized reference object and a defined reference system. Since the incline of the road substantially corresponds to the incline (in the driving direction and/or orthogonally to the driving direction) of a vehicle, the method is suitable for identifying the incline of a vehicle.

Advantageously, a driver assistance function, such as the automated parking brake (or APB for short), can be activated or actuated on the basis of the identified incline of the road. It is possible to define, for example, the level of the initial braking force in this way. Based on the information about the incline, it is also possible to define whether and with how much force a re-tensioning process should be carried out on the automated parking brake. Alternatively, the amount of time the parked vehicle should be monitored for possible rolling can also be determined on this basis.

Regarding the definition of a suitable reference object, it should be noted that, in particular, objects with perpendicular structures can be defined for this purpose. A structure is understood to be perpendicular when it is pointed at the center of the earth, i.e. it stands at a right angle to a horizontal earth's surface. Furthermore, objects with horizontal structures can also be selected and defined as reference objects. In addition to the definition, establishment and use of an individual reference object, it is also conceivable that a plurality of reference objects are defined and established and their angular relationships to the environment and/or the road are analyzed. The validity of the road incline estimate can be advantageously increased in this way.

Vehicle cameras in particular can be used as image sensors. Both the front camera and side cameras have proven to be well-suited for this purpose. For example, the side camera can also be employed to determine the image data for estimating the incline (or slope) in the driving direction, and the front camera can be employed to determine the image data for estimating the slope (or roll angle) orthogonally to the driving direction.

A two-dimensional or multi-dimensional coordinate system can be understood as the reference system of the image sensor. Said system has three axes, for instance: the x axis, y axis and z axis. Here, for example, the x axis corresponds to the longitudinal axis of the vehicle in the driving direction, the y axis corresponds to the transverse axis, and the z axis corresponds to the vertical axis of the vehicle.

The reference system of the image sensor is permanently associated with its frame of reference, the image sensor. This means that the frame of reference is invariable relative to the image sensor. Since the image sensor, usually a camera, is likewise permanently associated with the vehicle, the reference system is also invariable relative to the vehicle. If the position and/or orientation of the image sensor (and/or of the vehicle) changes relative to the environment, such as due to driving conditions and/or environmental conditions, this will accordingly also result in a change to the reference system relative to the environment.

Moreover, this reference system can advantageously be defined in such a way that an axis of the reference system corresponds to a real reference axis. For example, the reference system is defined such that the x axis and/or y axis coincides with the real horizon when the vehicle is located on a flat surface that is not inclined, for example. In a configuration such as this, the x axis and/or y axis can be understood to be a virtual horizon. When the orientation of the vehicle changes, for instance, if the vehicle is resting on an incline, a deviation occurs between the "virtual horizon" (x and/or y axis) and the real horizon on the image sensor as a result of having established the reference system. From this deviation, it is possible to calculate the incline of the road and/or the vehicle.

To identify the incline, the relationship between the reference object and a defined reference system of the image sensor is analyzed. The relationship is understood to be a relationship between the two elements. This can be an angular relationship, a positional reference or some other spatial or geometric connection or correlation.

In one advantageous embodiment, the method includes the method step: Calculating a deviation in the nominal angle between the reference object and the reference system. This is understood to mean that the angle between the reference object and the reference system is viewed in a differentiated way. On the one hand, the nominal angle of the reference object is identified. On the other hand, the deviation of the environment from the nominal angle of the reference object is identified. A nominal angle is understood to be an angle between the vertical structure of the reference object and a (possibly imagined) horizontal plane at the base point of the reference object. In the case of a perpendicular vertical structure of the reference object, the nominal angle is a right angle. The deviation of the reference system from the nominal angle of the reference object means the angular deviation of the reference system (e.g. the x and/or y axis) from a horizontal plane at the base point of the reference object. Advantageously, a good level of validity of the results is achieved in this way. Furthermore, it is relatively simple to make this determination.

In addition, it should be noted at this point that the nominal angle can already be calculated using previous measurements. The data calculated in this way can be called up when required as a database from an internal memory device or from the cloud. The same also applies to the incline of the road, which was determined at an earlier point, for example, when the acceleration sensor was still functioning. The nominal angle and/or the incline can then be accordingly entered and calibrated as a reference and/or used as a control for the estimate that then takes place. This further increases the validity of the results. Alternatively, the nominal angle of particular reference objects can also be provided and used as external information, such as by saved (and possibly GPS-related) data.

In one possible embodiment, the method comprises the method step: importing data that represent the defined reference system of the image sensor.

This is understood to mean that information relating to the concrete embodiment of the reference system can be taken into consideration to identify the relationship between the reference object and the reference system. This information describes, for example, the position and orientation in which the reference system should be placed. In this way, the reference system can be precisely adapted to existing conditions, such as the charge state of the vehicle for example. The correspondingly required data can be stored, for example, as functions or lookup tables in an internal storage device and can be read out accordingly. The definition and storage of the data can already occur ex works or can be subsequently saved to the memory device, such as by a transmission from a data memory or wireless transfer. Of course, it is also possible that the data have been determined automatically by the vehicle, for instance by taking into account the charging of the vehicle in the plane with a functioning acceleration/position sensor. In this way, good result quality can advantageously be achieved by means of simple calculations.

In one advantageous embodiment, the method includes identifying a positional relationship between the identified reference object and the reference system of the image sensor and/or identifying an angular relationship between the identified reference object and the reference system of the image sensor.

This should be understood to mean that the relationship between the reference object and the reference system can consider and analyze any relationship. Naturally, this also includes the positional relationship, such as a height deviation in the direction of they axis or/and a lateral deviation in the direction of the x axis between the reference object and the reference system. To this end, the reference object can be defined on the basis of its center and/or main line, for example. Likewise, the angular relationship can be taken into consideration, i.e. a rotation of the reference object with respect to the reference system can be analyzed.

In one advantageous embodiment of the method, the defined reference object has a substantially vertically oriented structure and/or the defined reference object has a substantially horizontally oriented structure.

This is understood to mean that the reference object contains or consists of a vertically oriented structure. The structure can run perpendicularly, for example. Perpendicular is understood—as was previously explained—to be when the structure runs at a right angle to the horizontal surface of the earth and/or is oriented toward the center of the earth. Of course, it is possible for only at least some parts of the structure to have a substantially vertical orientation. However, these parts are advantageously easy to differentiate from the rest of the structure and thus to identify in the image data. Advantageously, it is simple to calculate the angular deviations using vertical structures. Moreover, good validity with regard to the estimate of the road incline is achieved in this way. In an additional or alternative embodiment, the reference object can have or consist of a substantially horizontally oriented structure.

In one possible embodiment of the method, the defined reference object comprises and/or consists of one or more of the following objects:
 a building line,
 a building structure,
 a road sign,
 a guardrail, vegetation growing substantially perpendicular, in particular a tree trunk,
a building support in a building,
a wall and/or a vertical edge between two walls in a building.

Surprisingly, these objects in particular have proven to be suitable reference objects for the evaluation. As a result, a high degree of certainty can be achieved in the calculation of angular deviations. This allows for good results in the estimation of the road incline.

In one preferred embodiment, the defined reference object comprises and/or consists of a horizon line of the environment of the vehicle.

This should be understood to mean that the natural horizon can be utilized as a reference object in order to be able to determine the incline of the street through its relationship to the reference system. Advantageously, a high degree of certainty can thereby be achieved in a simple way in the estimation of the road incline.

In an alternative development, the estimate of the incline is carried out qualitatively and/or the estimate of the incline is carried out quantitatively.

This is understood to mean that, alternatively or additionally to the qualitative relationship (such as angular deviation), the exact quantitative relationship (such as the number of degrees or percentage of the angular deviation) can also advantageously be taken into consideration. Advantageously, the quality of the results can thereby be optimized.

In one advantageous embodiment, a y axis of the reference system of the image sensor is defined as a virtual horizon, and an incline in the driving direction is assumed when an offset between the horizon line of the environment of the vehicle and the virtual horizon is detected, and/or an incline orthogonally to the driving direction is assumed when a rotation between the horizon line of the environment of the vehicle and the virtual horizon is detected.

It is understood here that the actual horizon is considered as reference object. A coordinate system with at least one y axis, which runs parallel to a wheel axle of the vehicle, serves as a reference system. The reference system is furthermore defined and set such that the y axis of the reference system coincides with the line of the actual horizon when the vehicle is located on a flat, not inclined surface. If it is then recognized while the method is being carried out that the horizon line in the image data of the image sensor no longer coincides with the y axis of the reference system, it is concluded that the vehicle is located on an inclined road, i.e. an incline in the road. When a height offset is determined between the horizon line and the y axis (virtual horizon), it is concluded that there is an incline in the driving direction. If the horizon line lies above the y axis (virtual horizon), a negative incline, i.e. a gradient, in the driving direction is assumed. If the horizon line lies below the y axis (virtual horizon), a positive incline, i.e. an incline in colloquial terms, in the driving direction is assumed. If no parallelism is recognized between the horizon line and the y axis, this can be understood to be a rotation between the horizontal line and the y axis (virtual horizon). In this case, it is concluded that there is an incline of the road orthogonal to the driving direction, i.e. that the road and/or the vehicle has a roll angle.

In one preferred development of the method, the signal representing the incline of the road is used to control an assistance system, wherein the signal representing the incline of the road is used in particular to control:
an automatic parking brake and/or
a starting/stopping system and/or
a headlight range adjustment system and/or
a fuel level indicator.

Advantageously, the camera can thus be used as a sensor to detect the incline of the road and to exercise control of the driver assistance system on the basis of this data. Support of the driver is thereby permitted. Advantageously, the automated assistance systems can be maintained and implemented to a high degree and/or the necessity of driver intervention is thereby reduced. An assistance system can be understood to be, for instance, a system for carrying out an automated parking maneuver. Moreover, for example, a starting/stopping system or a headlight range adjustment system or a fuel lever indicator can also be understood to be assistance systems for the driver.

In an alternative embodiment, the method is carried out when an insufficient identification of the incline has been recognized by means of an acceleration sensor, in particular when the acceleration sensor is recognized to be malfunctioning and/or when a signal from the acceleration sensor is missing, faulty or invalid, or when the acceleration information is otherwise unavailable.

This is understood to mean that the method is carried out only when no valid signals of the acceleration sensor are present. The acceleration sensor is installed in a multitude of vehicles. For example, it is required for an ESP system. The sensor provides data about the acceleration in multiple dimensions. The incline of the vehicle is also normally calculated from this. Therefore, within the scope of the disclosure, incline sensors should also be subsumed under the term acceleration sensors. If this sensor fails, numerous functions are no longer available or can be carried out only with a limited functional range. The method, as disclosed, advantageously offers a redundancy concept for this sensor. In this sense, the method, as disclosed, is considered a fallback level for a failure of the acceleration sensor, especially when only an incline signal is required for the assistance function. Advantageously, the automated assistance systems can thereby be maintained and implemented to a high degree.

One possible embodiment discloses a method for operating a braking device of a vehicle, comprising the following steps:
identifying an insufficient calculation of the incline by means of an acceleration sensor; and
carrying out the method for identifying the incline of the road according to the disclosure; and
providing a signal for an automated parking brake, and activating the automated parking brake in consideration of the signal.

This is understood to mean that the method described for identifying the incline is integrated into a method for operating an automated parking brake. Advantageously, a redundancy concept for the parking brake is thereby created. In this instance, the regular method for operating the parking brake includes a calculating of the incline by means of the acceleration sensor. If this sensor malfunctions, the determination is then carried out by means of the video system. This type of redundancy is especially advantageous for (highly) automated parking maneuvers. Advantageously, only components are used that are installed in a vehicle of this kind anyway. By so doing, it is possible to forgo additional components and thus the costs of implementing the redundancy concept, which is advantageous.

According to the disclosure, a device is further disclosed for determining an incline of a road on which a vehicle is located, wherein the device is configured to carry out the method according to one of the method steps described above under normal conditions of use.

This is understood to mean that the device is designed, i.e. configured, and/or comprises means for carrying out a method as described above under normal conditions of use. A control unit and/or a memory element and/or an actuation element can be considered devices of this type. For example, an ESP control unit or APB control unit that carries out the control of a parking brake. In particular, a control unit is provided that is designed and configured to activate a plurality of available automated parking brakes of a vehicle independently of each other. Moreover, a device can also be understood to be an image sensor and/or a video system. Using devices such as these, it is possible to implement the advantages already described within the scope of the method.

A device is thus also understood to be an electrical device that processes sensor signals and emits control and/or data signals as a function thereof. The device can include an interface, which can be configured by means of hardware or software. In a hardware-based configuration, the interfaces can be part of a so-called system ASIC, for example, which contains a wide variety of functions of the device. It is also possible, however, that the interfaces are their own integrated circuits or consist at least in part of discrete components. In a software-based configuration, the interfaces can be software modules that are present on a microcontroller, for example, alongside other software modules. The problem addressed by the disclosure can also be solved efficiently and cost-effectively by this embodiment variant of the disclosure in the form of a device.

In addition, an automated parking brake is provided, which is configured to carry out the method according to one of the method steps described above under normal conditions of use.

Advantageously, a computer program is also disclosed, which is designed to carry out the described method when the computer program product is run on a device, as well as a machine-readable memory medium on which the computer program is stored. This is understood to mean that the computer program contains a program code for carrying out one or more or all of the aforementioned method steps when the computer program is run on a computer. Advantageous here is thus also a computer program product with program code that can be stored on a machine-readable carrier, such as a semiconductor memory, hard drive memory or an optical storage device, and is used to carry out the method according to one of the embodiments described above when the program product is run on a computer or a device. In this regard, the approach introduced here produces a computer program product with program code for carrying out the method according to one of the variants disclosed here when the program product is run on a device.

BRIEF DESCRIPTION OF THE DRAWINGS

It should be pointed out that the features disclosed individually in the description can be combined with one another in any technically sensible way and demonstrate further configurations of the disclosure. Further features and the practicality of the disclosure arise from the description of exemplary embodiments on the basis of the attached drawings.

In the drawings.

DETAILED DESCRIPTION

Figure 1:
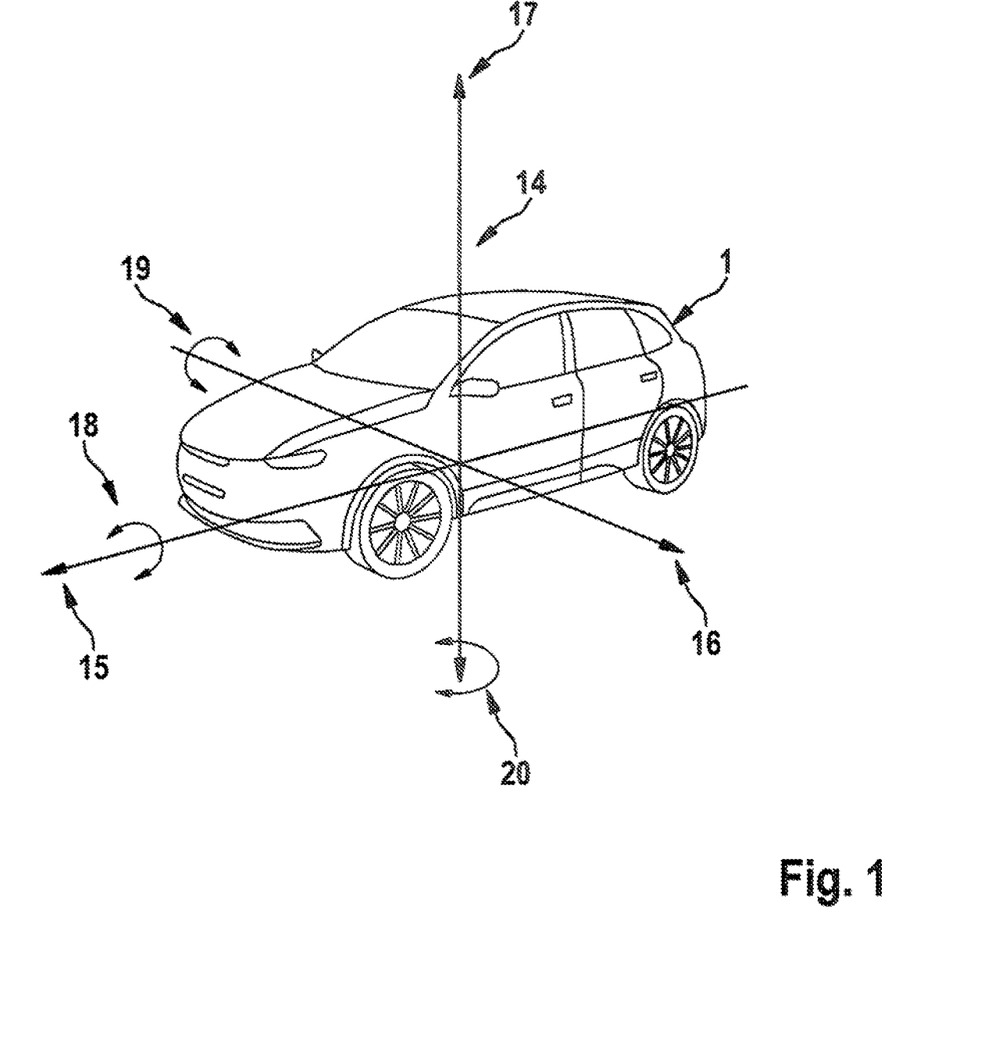
FIG. 1 shows a schematic representation of the vehicle coordinate system.

FIG. 1 shows a schematic representation of the vehicle coordinate system 14. The vehicle 1 is configured as a passenger car. The longitudinal axis 15 of the vehicle is designated the x axis, and the transverse axis 16 of the vehicle is designated the y axis, and the vertical axis 17 of the vehicle is designated the z axis. The rotation about the y axis is designated the slope 19 and/or the incline angle in the driving direction. The rotation about the x axis is designated roll 18 orthogonally to the driving direction. The rotation about the z axis is designated yaw 20.

Figure 2:
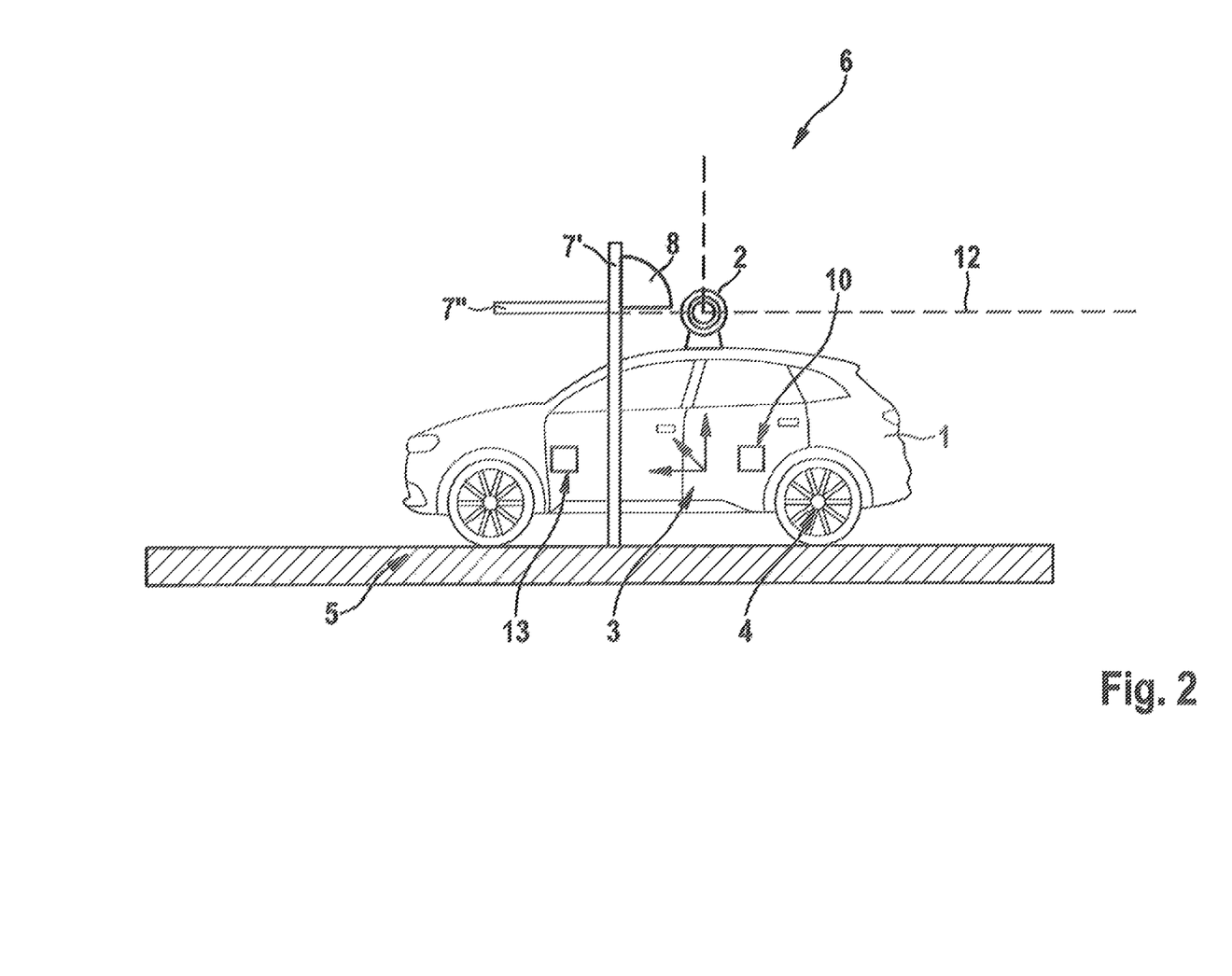
FIG. 2 shows a schematic representation of a vehicle with a camera, which records a reference object located laterally to the vehicle on a horizontal road, shown in a side view.
Figure 4:
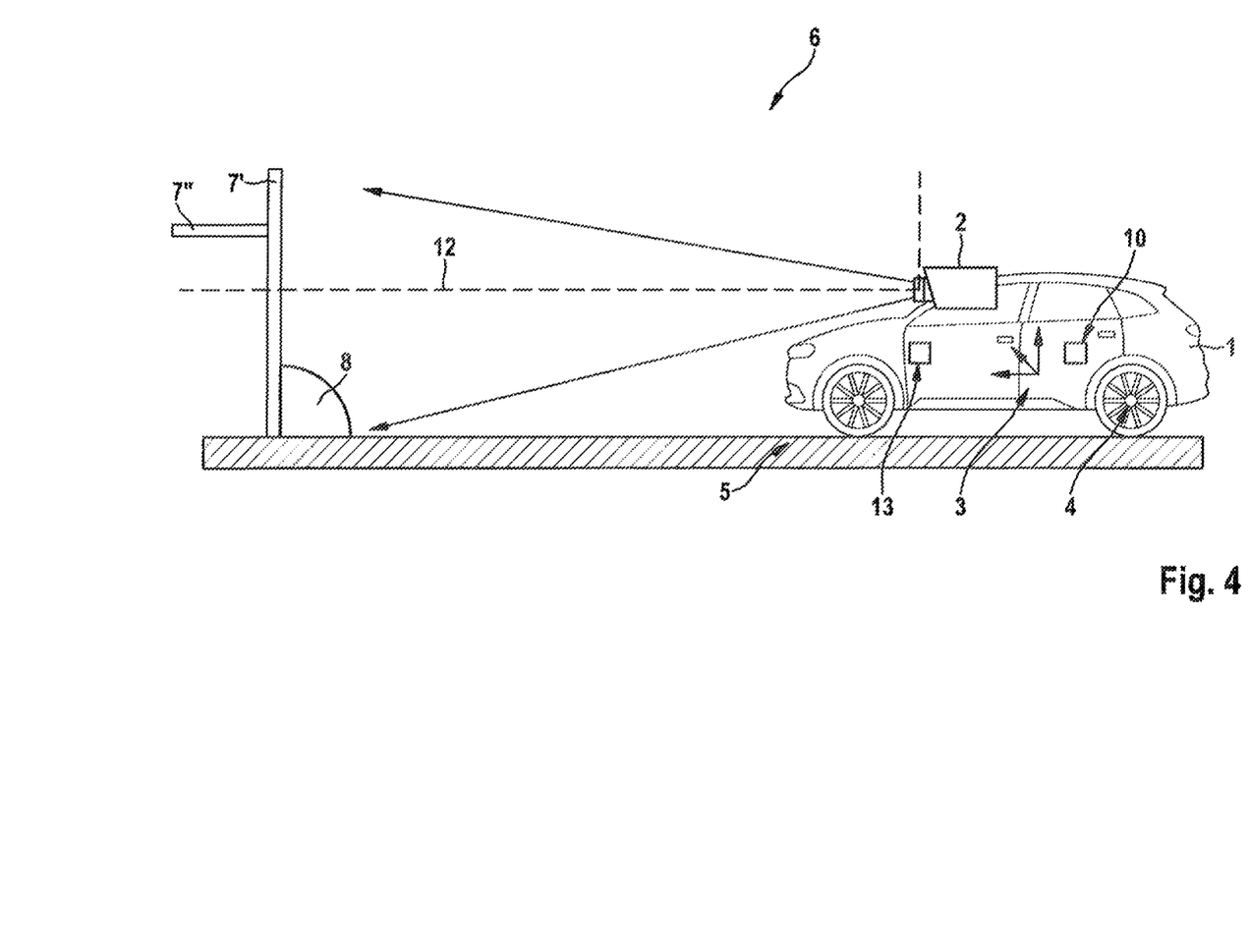
FIG. 4 shows a schematic representation of a vehicle with a camera, which records a reference object on a horizontal road, shown in a side view.

FIGS. 2 and 4 show a schematic representation of a vehicle with a camera, which records a reference object on a horizontal road. The vehicle 1 is configured as a passenger car. This vehicle 1 has an image sensor 2. Said image sensor 2 is a camera that is directed outward. A front camera and/or a side camera can be employed here, for example. The drawn-in lines indicate exemplary detection points from the detection area of the image sensor 2. The dashed lines indicate an exemplary reference system 12 of the image sensor 2. The reference system can be formed as a single- or multi-dimensional coordinate system. The image sensor 2 generates image data of the environment 6 of the vehicle 1. These image data are further processed by the control unit 10, for example. Furthermore, the vehicle 1 has an acceleration sensor 3. The acceleration sensor 3 is represented as a three-dimensional coordinate system in order to emphasize the position detection capability. Usually, however, six dimensions are detected by the acceleration sensor 3, wherein the rotation rates can also be taken into account here. As has already been indicated, the incline of the vehicle 1 can be identified by means of the acceleration sensor 3. For the most part, the incline of the vehicle 1 matches the incline of the road 5. For this reason, the incline of the road 5 can also be estimated by a functional acceleration sensor 3. The knowledge of the road incline is important, for instance, for the control of an assistance system 13 in order to enable, activate and/or adapt the activation of driving functions and/or driving assistance functions of an assistance system 13. For instance, the brake application force and the necessity and force of a re-tensioning process by the automated parking brake 4 is also defined by the road incline. The vehicle 1 has two automated parking brakes 4, one on each of the rear wheels, which are indicated in FIG. 2. Moreover, a reference object 7' is shown in FIG. 2. This reference object 7' has a substantially perpendicular structure. The reference object 7" can be the corner of a house, for example. Owing to the perpendicularly oriented structure of the reference object 7', a right angle is formed between the road 5 and the reference object 7' on a horizontal road 5. The angle between the reference object 7' and a horizontal line in the base point of the reference object 7' is marked as a nominal angle 8. Furthermore, the drawing shows a reference object 7' with a horizontal structure.

Figure 3:
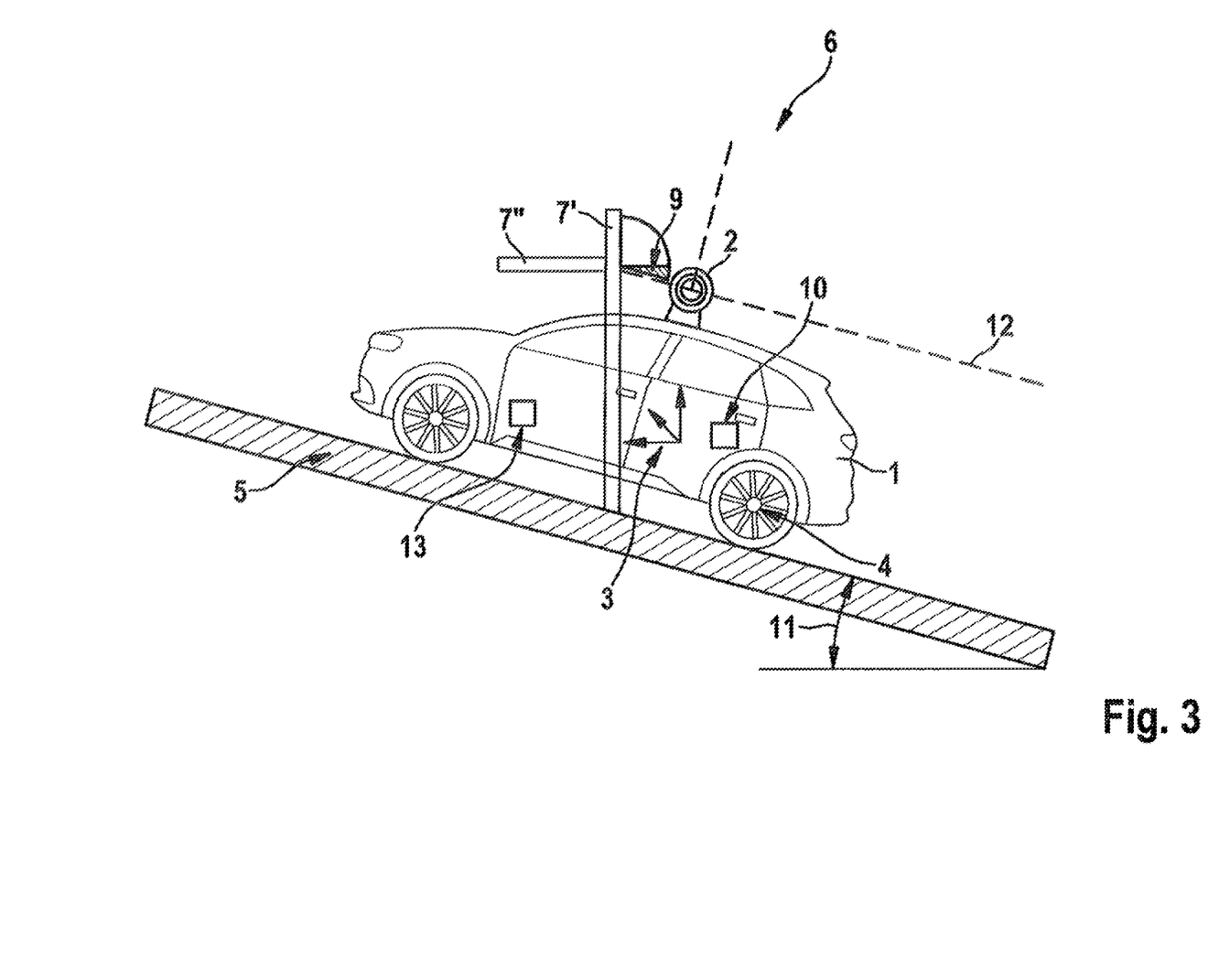
FIG. 3 shows a schematic representation of a vehicle with a camera, which records a reference object located laterally to the vehicle on a road that is inclined in the driving direction, shown in a side view.
Figure 5:
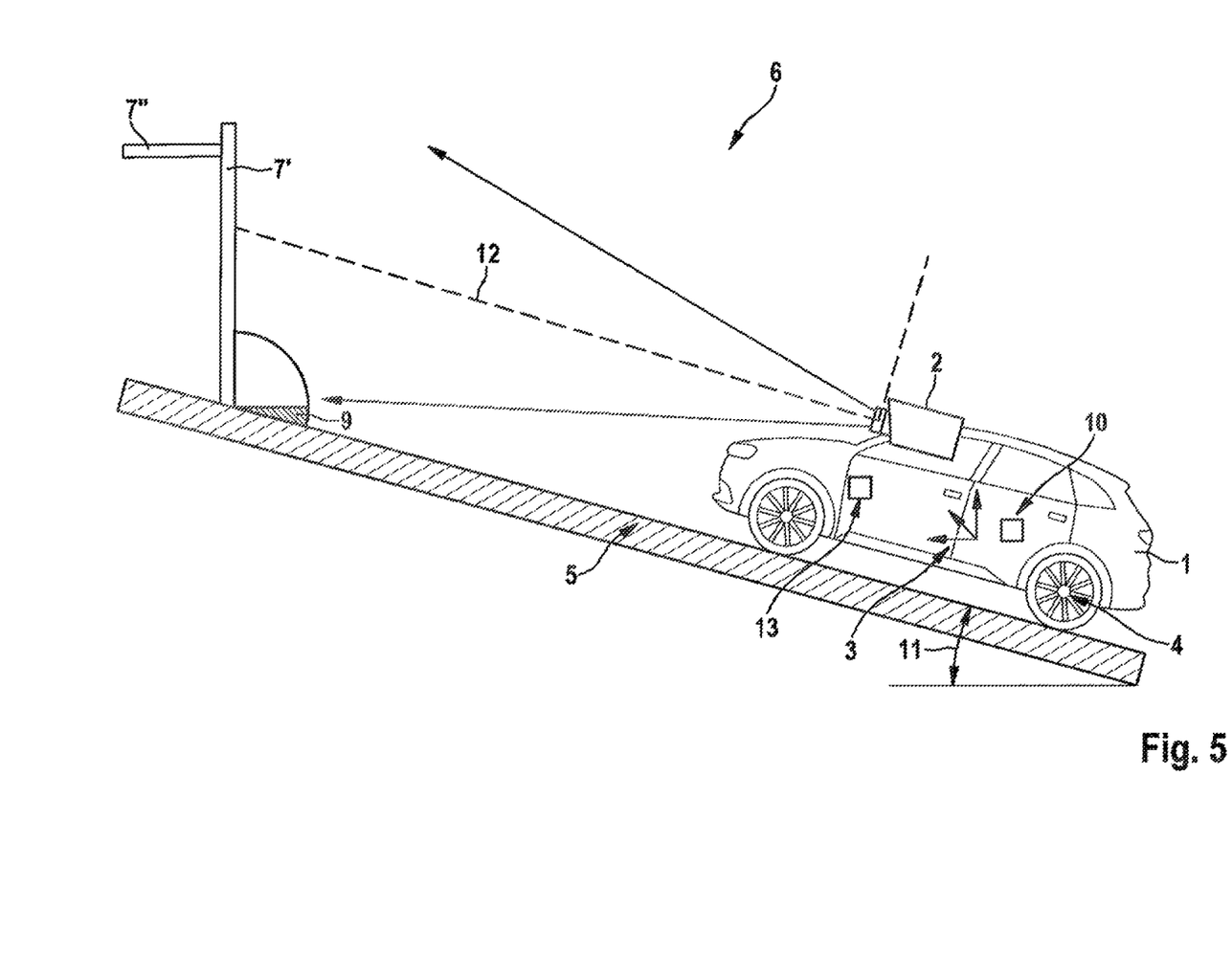
FIG. 5 shows a schematic representation of a vehicle with a camera, which records a reference object on a road that is inclined in the driving direction, shown in a side view.

FIGS. 3 and 5 show a schematic representation of a vehicle with a camera, which records a reference object, and the vehicle is located on an inclined road. The elements shown substantially correspond to the elements shown in FIGS. 2 and 4. Also shown is the incline 11 of the road 5 on which the vehicle 1 is located. The incline 11 shown here runs in the driving direction. A change in the angle between the reference object 7' (and 7") and the road 5 also arises from the incline 11 of the road 5. This change from the nominal angle of the reference angle 7' is characterized as a deviation 9.

Figure 6:
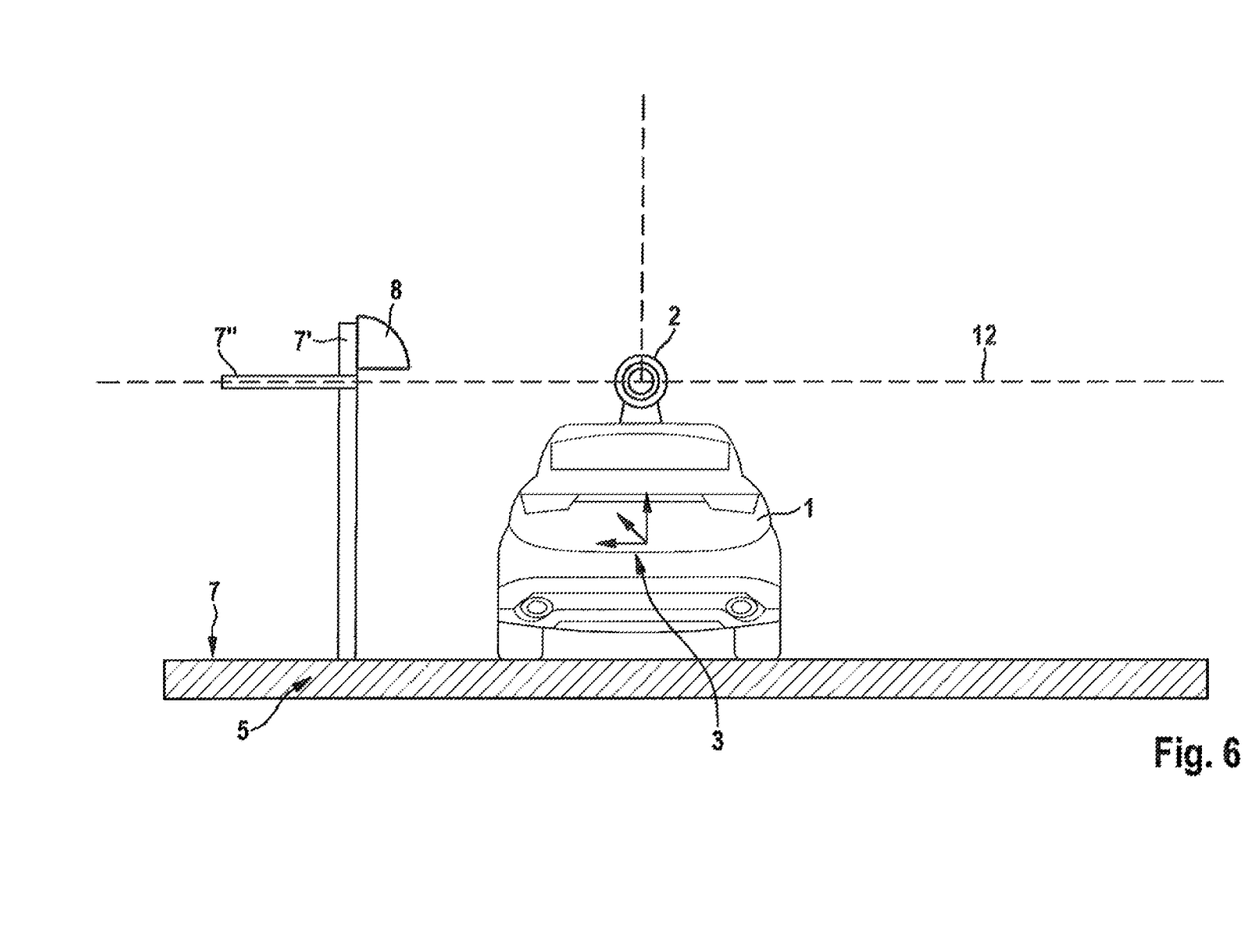
FIG. 6 shows a schematic representation of a vehicle with a camera, which records a reference object on a horizontal road, shown in a rear view.

FIG. 6 shows a schematic representation of a vehicle with a camera, which records a reference object on a horizontal road, shown in a rear view. The elements shown substantially correspond to the elements shown in the previous drawings. Additionally, a further dimension of the reference system 12 of the image sensor 2 is shown.

Figure 7:
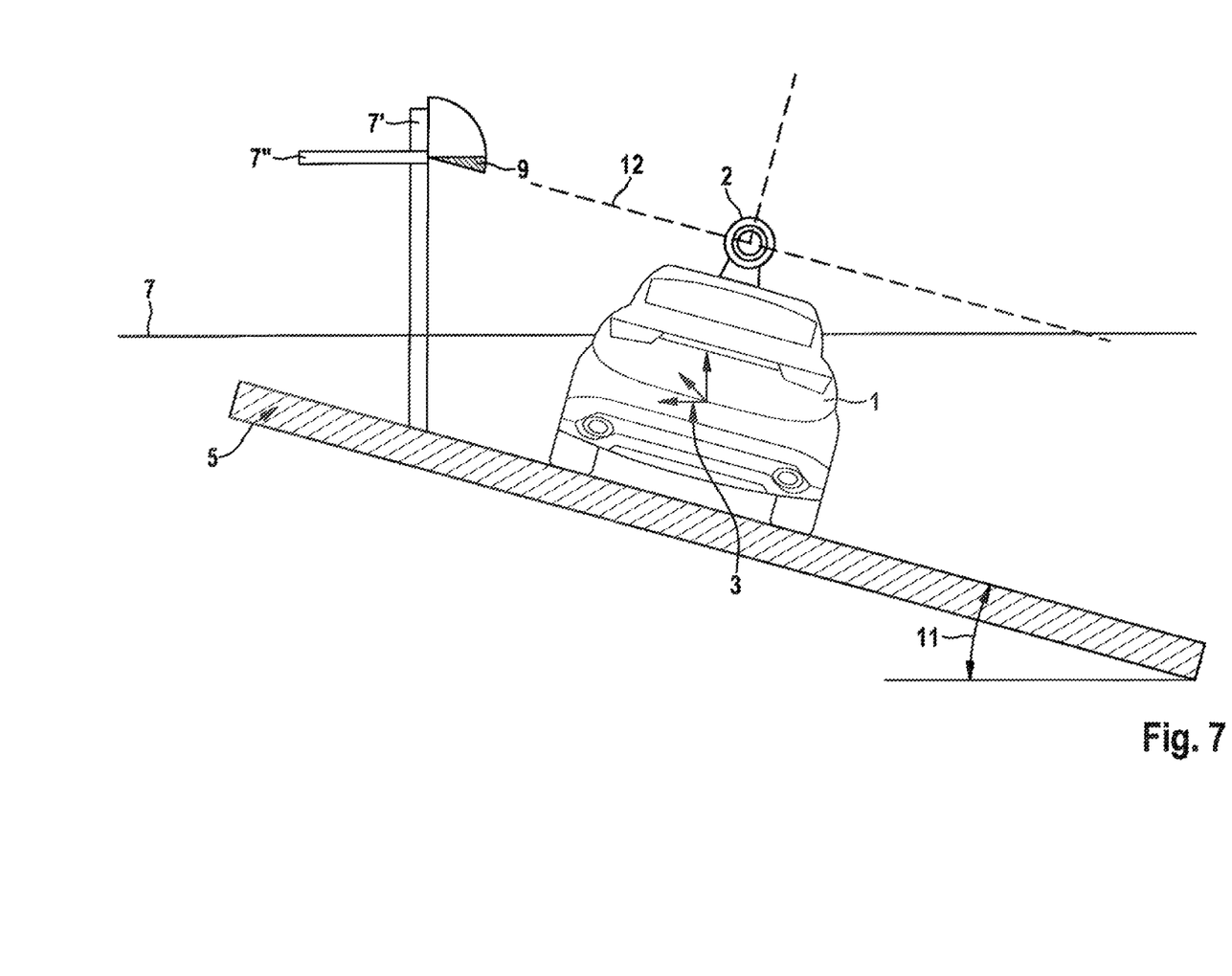
FIG. 7 shows a schematic representation of a vehicle with a camera, which records a reference object on a road that is inclined orthogonally to the driving direction, shown in a rear view.

FIG. 7 shows a schematic representation of a vehicle with a camera, which records a reference object, and the vehicle is located on an inclined road. The elements shown substantially correspond to the elements shown in the previous drawings. As in FIGS. 3 and 5, the incline 11 of the road 5 on which the as 1 is located is also shown in FIG. 7. The incline 11 shown here runs in the roll direction of the vehicle, i.e. orthogonally to the actual driving direction. FIG. 7 also shows a further reference object 7, namely the horizon and/or the line of the horizon. An analysis of the relationship between the reference system 12 of the image sensor 2 and the reference object 7 (and/or the further reference objects 7' and 7") permits the determination of the road incline 11.

Figure 8A:
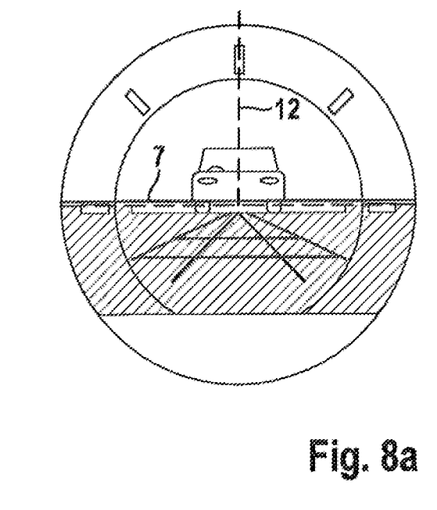
FIG. 8a-8c show schematic representations of a vehicle with a camera as well as the relationship between the reference system of the image sensor and the horizon with various road inclinations.
Figure 8B:
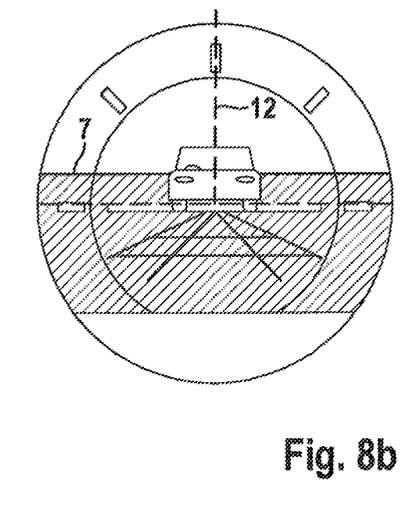
Figure 8C:
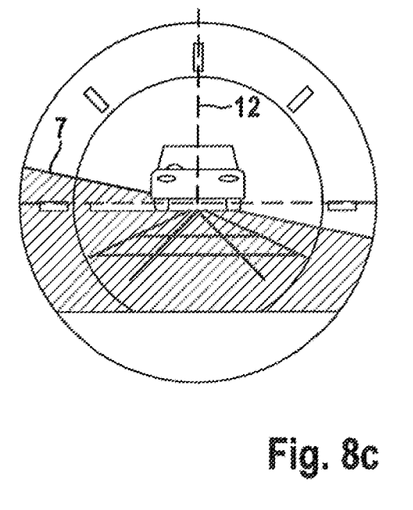

FIGS. 8a, 8b and 8c show schematic representations of a vehicle with a camera as well as the relationships between the reference system of the image sensor and the horizon with various road inclines. The image sensor 2 is embodied, for example, as a front camera of the vehicle 1 and is thus firmly attached to it locally. The reference system 12 of the image sensor 2 is therefore invariable with respect to the vehicle 1. The image sensor 2 records the environment 6 of the vehicle 1. Furthermore, the horizon is defined as a reference object 7. The reference object 7 is found as a horizon line in the image data of the image sensor 2. The reference system 12 of the image sensor 2 is defined such that an axis of the reference system 12 runs substantially congruently with the horizon line when the vehicle 1 is not on an incline 11. This is shown in FIG. 8a. However, in FIG. 8b the reference object 7, i.e. the horizon line, is displaced parallel to said axis of the reference system 12. From this relationship, it is possible to determine that the vehicle is located on a road which includes an angle in the driving direction (incline/gradient). In FIG. 8c the reference object 7, i.e. the horizon line, is displaced at an angle that is rotated in relation to said axis of the reference system. From this relationship, it is possible to determine that the vehicle is located on a road which includes an angle orthogonally to the driving direction (inclination).

Figure 9:
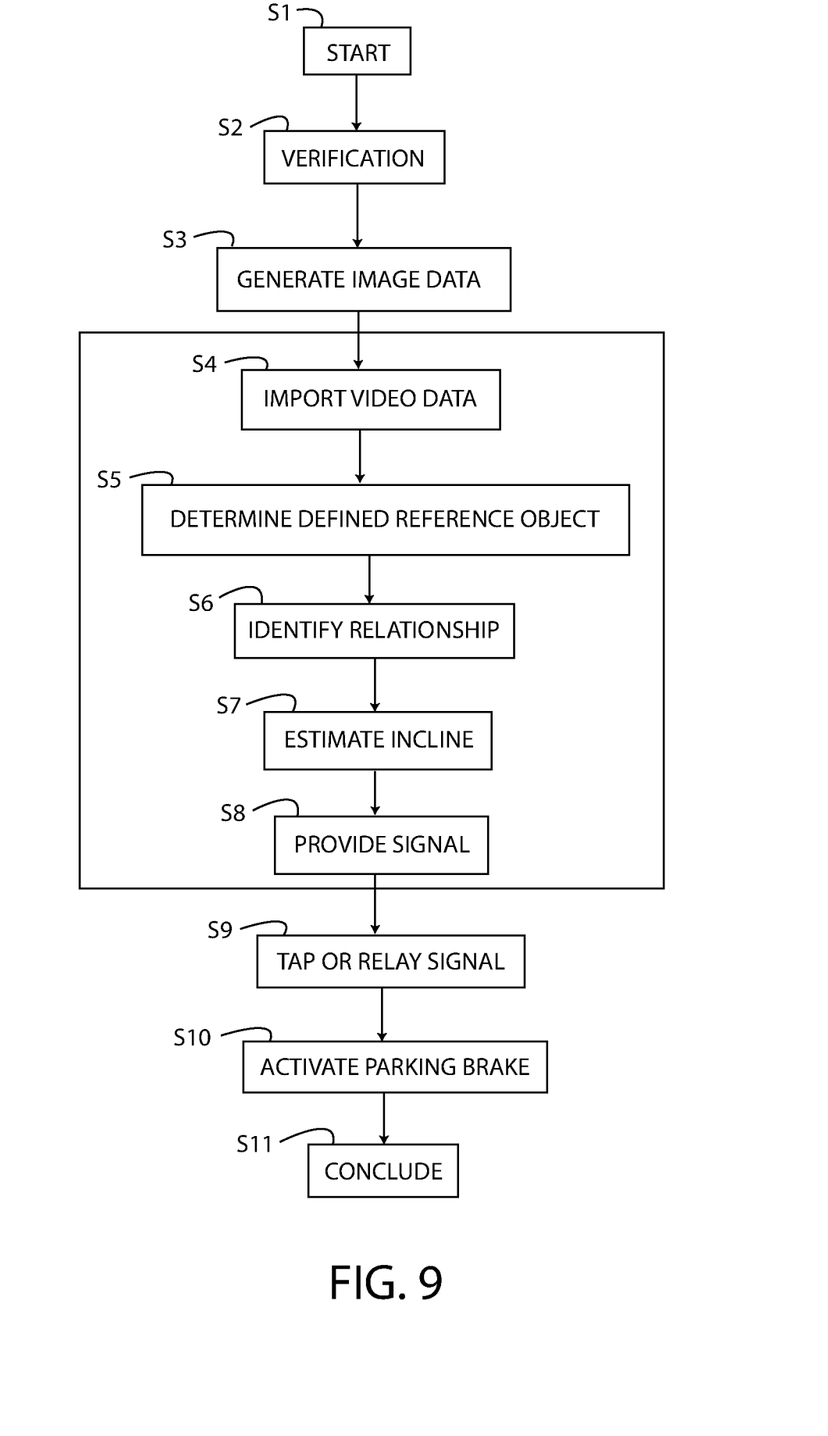
FIG. 9 shows the method steps of an exemplary embodiment of the method.

FIG. 9 shows a representation of the method steps of an embodiment of the disclosure. Here, the start of the method occurs in a first step S1. The start of the method can be manually activated, for example, and/or can be automated by external factors such as the ignition of the vehicle or a particular driving situation. In a next step S2, it is verified as to whether the necessary conditions exist for carrying out the further method steps. At this point, for instance, it is verified whether valid acceleration information is available. Alternatively or additionally, a verification can be made in S2 as to whether an incline signal is required in the current driving situation. If data are available from the acceleration sensor and seem trustworthy, then these data can already be utilized to control a vehicle function. If an absence of acceleration information is identified in step S2, then the further steps of the method are executed. For example, image data are generated by means of the image sensor of a video system of the vehicle in a next step S3. The video system is oriented forward in the driving direction of the vehicle, for example, and records the environment of the vehicle in the detection area of the video system in front of the vehicle.

In a next step S4, the image data that were generated by the video system are imported. The importing can take place in a control unit with a data memory device, for instance.

Subsequently, the image data are processed and analyzed. At this point, the determination of the defined reference object takes place in a step S5. This includes the identification of the reference object. Furthermore the reference object can be marked, labeled or characterized in some other way. In a next step S6, a relationship between the reference object and a defined reference system of the image sensor is identified. This is understood to mean, for example, ascertaining the angular relationship and/or positional relationship between the reference object (such as the actual horizon) and a defined image axis of the image sensor (such as a virtual horizon). Within the framework of the determination of the angular relationships, it is also possible to identify a nominal angle (such as the nominal angle of the reference object) and/or a deviation of the actual angle from the nominal angle. In a next step S7, the incline of the vehicle is estimated on the basis of the calculated data. Once the estimate has been made, it can also be compared with available data (such as data from earlier measurements when the acceleration sensor was still functioning) for the purpose of validation. Following this, a signal representing the identified incline in the road is provided in step S8. Naturally, this signal can be tapped or relayed in a further step S9. For example, the signal is relayed to the control unit of the automated parking brake. The control unit of the automated parking brake is regularly integrated into the control unit of the ESP system, for instance formed by it. The signal that is now applied there is thereafter reflected during the control of the automated parking brake. In a step S10, the automated parking brake is correspondingly activated on the basis of or at least in consideration of the determined signal for the road incline. The method is concluded in a step S11, for example by a manual deactivation or an automatic deactivation, such as in a parked vehicle.

What is claimed is:

1. A method for determining an incline of a road on which a vehicle is located, comprising:

importing image data of an environment of the vehicle, the image data generated by an image sensor mounted on the vehicle;

identifying a defined reference object in the environment of the vehicle from the imported image data, the defined reference object having a fixed position relative to the road;

identifying a relationship between the identified defined reference object and a defined reference system of the image sensor;

estimating the incline of the road on which the vehicle is located based on the identified relationship; and providing a signal representing the estimated incline of the road on which the vehicle is located.

2. The method according to claim 1, further comprising:
importing data that represent the defined reference system of the image sensor.

3. The method according to claim 1, further comprising:
identifying a positional relationship between the identified defined reference object and the defined reference system of the image sensor; or identifying an angular relationship between the identified defined reference object and the defined reference system of the image sensor.

4. The method according to claim 1, wherein the defined reference object has a substantially vertically oriented structure or a substantially horizontally oriented structure.

5. The method according to claim 1, wherein the defined reference object includes one or more of the following objects:
a building line,
a building structure,
a road sign,
a guardrail,
vegetation growing substantially perpendicular,
a building support in a building, and
at least one of a wall and a vertical edge between two walls in the building.

6. The method according to claim 5, wherein the vegetation growing substantially perpendicular is a tree trunk.

7. The method according to claim 1, wherein the defined reference object includes a horizon line of the environment of the vehicle.

8. The method according to claim 1, further comprising:
estimating the incline of the road at least one of qualitatively and quantitatively.

9. The method according to claim 1, further comprising:
defining an x axis of the defined reference system of the image sensor as a virtual horizon; and determining an incline orthogonal to the driving direction when a rotation is detected between the horizon line of the environment of the vehicle and the virtual horizon.

10. The method according to claim 1, wherein:
the signal representing the estimated incline of the road is used to control an assistance system.

11. The method according to claim 10, wherein the signal representing the estimated incline of the road is used to control at least one of:
an automatic parking brake;
a starting/stopping system;
a headlight range adjustment system; and
a fuel level indicator.

12. The method according to claim 1, further comprising:
estimating the incline of the road when an insufficient identification of the incline of the road has been recognized using an acceleration sensor.

13. The method according to claim 12, wherein the method is carried out when at least one of the acceleration sensor is recognized to be malfunctioning and a signal from the acceleration sensor is missing, faulty or invalid, or when acceleration information from the acceleration sensor is otherwise unavailable.

14. A method for operating a braking device of a vehicle, the method comprising:
identifying an insufficient calculation of an incline of a road using an acceleration sensor;

using image data to identify the incline of the road in response to identifying the insufficient calculation by:
  (i) importing image data of an environment of the vehicle, the image data being generated by an image sensor,
  (ii) identifying a defined reference object in the environment of the vehicle from the imported image data,
  (iii) identifying a relationship between the identified defined reference object and a defined reference system of the image sensor, and
  (iv) estimating the incline of the road based on the identified relationship, providing the signal estimating the incline of the road to an assistance system; and controlling the assistance system in consideration of the signal estimating the incline of the road.

15. A device for determining an incline of a road on which a vehicle is located, wherein the device is configured to carry out a method under normal conditions of use, the method including:
importing image data of an environment of the vehicle, the image data being generated by an image sensor mounted on the vehicle;

identifying a defined reference object in the environment of the vehicle from the imported image data, the defined reference object having a fixed position relative to the road;

identifying a relationship between the identified defined reference object and a defined reference system of the image sensor;

estimating the incline of the road on which the vehicle is located based on the identified relationship; and providing a signal representing the estimated incline of the road on which the vehicle is located.

* * * * *